(12) United States Patent
Van Buskirk et al.

(10) Patent No.: US 9,078,392 B2
(45) Date of Patent: Jul. 14, 2015

(54) PNEUMATIC SYSTEM FOR OPERATING ROW TREATING UNITS FOR MULTI-ROW AGRICULTURE IMPLEMENTS

(71) Applicants: L & B Manufacturing, Inc., Brownsdale, MN (US); Yetter Manufacturing Company, Colchester, IL (US)

(72) Inventors: Loyd C. Van Buskirk, Brownsdale, MN (US); Dylan C. Van Buskirk, Brownsdale, MN (US); Derek K. Allensworth, Macomb, IL (US)

(73) Assignee: L & B MANUFACTURING, INC., Brownsdale, MN (US)

( * ) Notice: Subject to any disclaimer, the term of this patent is extended or adjusted under 35 U.S.C. 154(b) by 260 days.

(21) Appl. No.: 13/833,527

(22) Filed: Mar. 15, 2013

(65) Prior Publication Data

US 2014/0262380 A1    Sep. 18, 2014

(51) Int. Cl.
*A01C 5/06*     (2006.01)
*A01B 63/00*   (2006.01)

(52) U.S. Cl.
CPC ............... *A01C 5/06* (2013.01); *A01B 63/008* (2013.01)

(58) Field of Classification Search
CPC ........ A01B 49/04; A01B 63/008; A01C 5/06; A01C 5/062; A01C 5/064; A01C 21/00; A01C 7/203; A01C 7/205; F15B 11/042; F15B 2211/3057; F15B 2211/7053
USPC ........ 701/50; 111/134, 136, 164, 167, 55, 62, 111/195, 200; 172/2–11, 468, 763, 773
See application file for complete search history.

(56) References Cited

U.S. PATENT DOCUMENTS

| | | | |
|---|---|---|---|
| 5,260,875 A | 11/1993 | Tofte et al. | |
| 5,479,992 A | 1/1996 | Bassett | |
| 6,701,857 B1 | 3/2004 | Jensen et al. | |
| 8,550,020 B2 * | 10/2013 | Sauder et al. | 111/200 |
| 8,863,857 B2 * | 10/2014 | Bassett | 172/2 |
| 2013/0032362 A1 | 2/2013 | Rylander | |

* cited by examiner

*Primary Examiner* — Robert Pezzuto
(74) *Attorney, Agent, or Firm* — Nikolai & Mersereau, P.A.; C. G. Mersereau

(57) ABSTRACT

A pneumatic system capable of operating a number of pneumatic operators associated with a plurality of row units attached to a multi-row planting or seeding system or other tow bar arrangement, or the like, and with an ability to modulate or control the adjustment of air pressures, manually and electronically, raise and lower implements and adjust the force exerted by individual implements on the soil associated with each row unit is included. The system can be controlled remotely as from a remote switch or control panel located in the cab of an associated tractor.

10 Claims, 7 Drawing Sheets

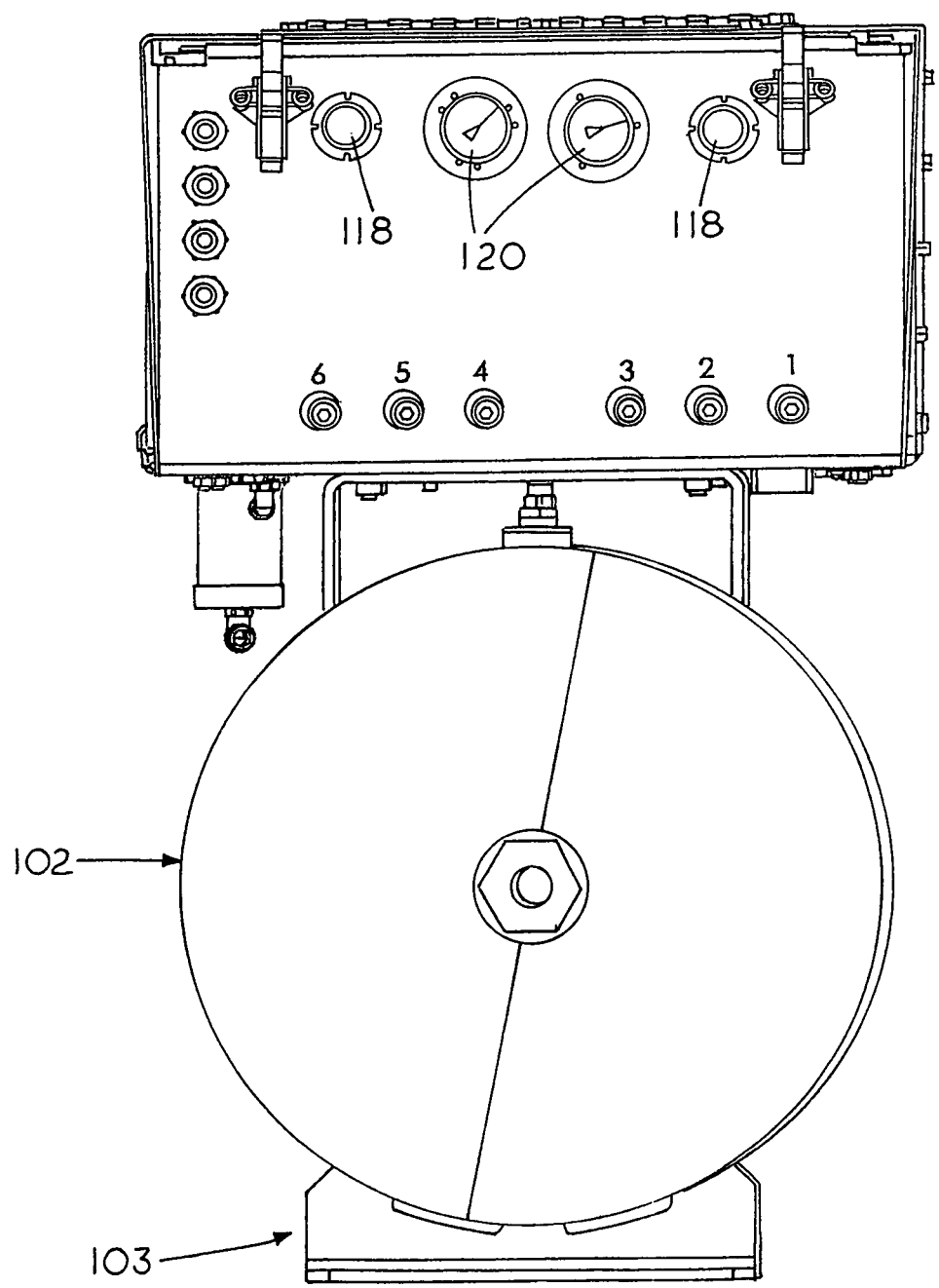
FIG. IC

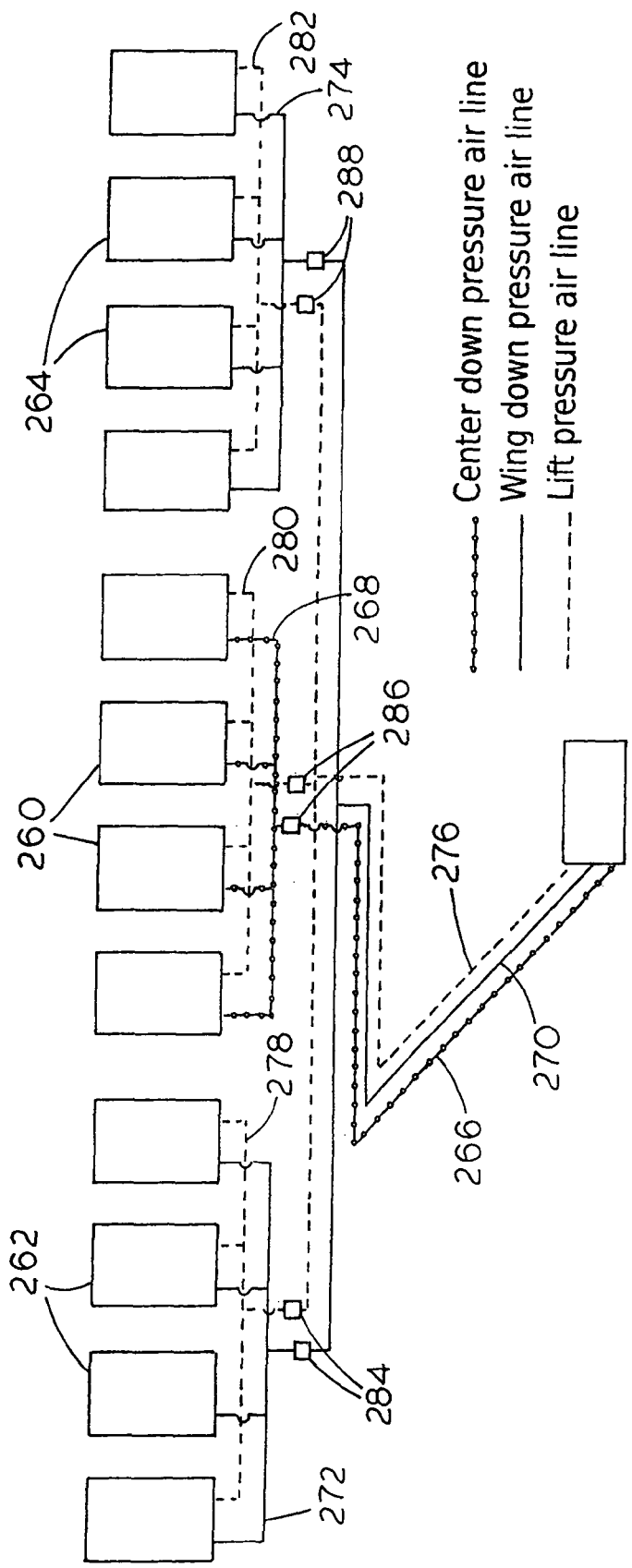

PNEUMATIC SYSTEM FOR OPERATING ROW TREATING UNITS FOR MULTI-ROW AGRICULTURE IMPLEMENTS

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

This invention is directed generally to the field of agricultural machinery, and more particularly, it relates to the operation of implements generally associated with the planting function, including preplanting tillage implements and said trench closing and packing implements generally used in combination with multi-row planting or seeding devices, fertilizer applicators and other soil treating systems. Specifically, the invention relates to a pneumatic implement deployment and control system designed to supply and control air to a variety of pneumatically operated tillage and fertilizing implements including rolling basket, row cleaning or trash whipping devices, coulter devices and/or seed trench closing and packing wheels of planter row units. The rolling basket, trash whip, coulter and/or closing and packing wheel devices may be used in tandem in various combinations. The system employs pneumatic operators in various combinations and they may have independent height or deployment force adjustment aspects. The system is designed to allow many functions to be remotely controlled as from the cab of a tractor or other prime mover vehicle.

II. Related Art

In the spring or fall, prior to planting, farmers must prepare their fields for accepting seed. Many tillage implements have been designed and are used to condition the soil in preparation for planting. Traditional farming includes both primary and secondary tillage tasks to prepare the soil such as plowing, disking, field cultivating and harrowing. Disking is an example of a method of primary tillage and harrowing is an example of a method of secondary tillage.

Primary tillage is an optional first pass over the soil using a soil conditioning implement attached to the rear of a tractor which works deep into the soil. The soil is usually worked several inches deep to break up clods of soil, remove air pockets, and destroy weeds deep in the earth.

Secondary tillage involves another pass over the same soil, at a more shallow depth, using implements which are generally attached to the rear of the primary tillage unit or to the front of a planter such that the secondary tillage unit follows the primary tillage unit. The secondary tillage unit generally may work the soil to a depth of a few inches or more, but usually not to exceed the desired seed planting depth. More recently, secondary tillage may be the only soil conditioning that takes place prior to planting.

A secondary tillage unit usually includes the final conditioning tools to prepare the soil for planting. Thus, rotating blade coulter units may be used to chop up crop residues and loosen the soil; and row cleaners, which include a pair of converging multi-bladed trash wheels, used to move the crop residue out of the way to provide a cleared area for rows to be planted. Rolling baskets also may be used to break up soil clods and break up any crust on the top of the soil prior to planting.

After the soil has been prepared and crop residue moved out of the way, the planting/seeding operation takes place. Seeding devices are multi-row devices pulled by tractors and include opening disks that create an open seed trench that allows for seed to be dropped into soil at a metered rate and set depth. Thereafter, the trenches made by the opening disks must be closed with the proper amount of pressure and the soil firmed/packed. This is preferably done using, in combination, pairs of closing wheels followed by firming/packing wheels which are mounted on a row unit or tool bar. A combination of these implements may be associated with each row unit on the seeding equipment.

With regard to all of these implements, it has been difficult to adjust them to accommodate variations in soil types and conditions prior to and during the planting operation. Thus, rolling baskets tend to become filled and clogged with soil in areas that are very wet and would benefit from an operating or deployment device that could raise the basket out of use in wet areas and re-deploy the basket in areas where the soil is more suitable; and also adjust the force exerted by the basket on the soil. Coulters include a sharp rotating blade or wedge wheel which cuts through crop residue and loosens the soil to the same or a slightly shallower depth that the depth of the seed trench provided by the opening disks of a planter. Controlling the force exerted by the coulter blade so that a constant depth can be achieved is important. Coulters are also often attached to fertilizer distributing equipment and it is desirable that the depth of these also be properly controlled. Row cleaning trash moving or trash whipping devices use pairs of angled disks with radially distributed teeth or spikes to move crop residue out of the way in advance of planting. Controlling the depth of penetration of the disk spikes on an on-going basis has long been sought.

After the soil has been prepared and crop residue moved out of the way, the planting/seeding operation takes place. Planters are multi-row devices pulled by tractors and include sets of opening disks that create trenches along each of a number of spaced rows for accepting seed. Seed distribution devices on the planter follow placing seeds at spaced intervals along the trenches. Thereafter, the trenches made by the opening disks must be closed with the proper amount of pressures and the soil packed. This is preferably done using, in combination, pairs of closing wheels followed by packing wheels which are mounted on the row unit of the planter. Combinations of these implements are associated with each row unit on the planter. The closing wheels are designed to crush and crumble trench walls inward from both sides. A problem with prior closing wheel assemblies is that in some instances downward directed force will cause the closing wheels to penetrate to a depth that interferes with the seeds planted at the bottom of the trench and causes problems with the seed spacing and depth. This may even lead to some seeds being thrown from the seed trench. Control of the penetration depth is highly desirable.

The packing wheels are designed to follow the closing wheels and pack the soil over the seeds. This must be accomplished with a proper amount of pressure to be successful. Thus too little pressure results in voids or air pockets in the soil, and too much pressure will compact the soil to tightly making it difficult for the plants to sprout through the hard packed soil and moisture will not penetrate the ground as easily as desired. It would present a desirable advantage if the depth and amount of pressure exerted by the closing mechanisms could be more closely and conveniently controlled.

In accordance with the present invention, it has been found that a system using pneumatic operators provides a beneficial approach to deploying retracting and adjusting the operation of the implement of one or more row units associated with a multi-row agriculture implement such as a planting or seeding implement. Such row units may include rolling baskets, trash movers, coulter devices, closing wheels, and/or packing wheels alone or in any desired combination.

SUMMARY OF THE INVENTION

By means of the present invention there is provided a pneumatic system capable of operating a number of pneumatic operators associated with a plurality of row units attached to a multi-row planting or seeding system or other tow bar arrangement, or the like, and with an ability to modulate or control the adjustment of air pressures, manually and electronically, raise and lower implements and adjust the force exerted by individual implements on the soil associated with each row unit. The system can be controlled remotely as from a remote switch or control panel located in the cab of a tractor or through a virtual terminal that is integrated into the tractor or primary mover's isobus/CANbus network.

The system includes an accumulator tank, air compressor (electric or hydraulic), adjustable air regulators, electric and manual, air lines and dump valves, and a remote switch panel, preferably located in the cab of the pulling tractor. The accumulator needs to be of a sufficient capacity to perform the varying functions with additional reserve and, in one embodiment, a control box containing the compressor and valving is located on a mounting plate on the accumulator tank. The tank preferably includes a programmable solenoid dump valve to drain moisture from a moisture separator located at the bottom of the tank. The air compressor is capable of 150 psi continuous duty and includes an electronic solenoid and a pressure switch to control the pressure in on the accumulator tank, also includes a solenoid valve head dump for easier starting.

The system further includes a number of adjustable electronic air pressure regulators known as PQE's (proportional quick exhaust). Manually adjustable air pressure regulators with gauges are mounted in the control box so they can be accessed and adjusted from the outside. The pneumatic operators, which may be cylinders or airbags, may be controlled by multi-port switchable valves such as 5-port solenoid valves.

A VDM (valve drive module) is used to control the PQE's, the optional 5-port valves and certain dump valves. The VDM sends and receives messages using the standard SAE J1939 and ISO 11783 communication protocols allowing it to integrate with a CANbus network provided on the implement and/or tractor in a well-known manner. This allows the operator to use the tractor's virtual terminal to control the functions of the system. The functions may also all be controlled from a switch panel which includes a main on/off switch, the up and down switches for deploying and stowing various attached implements and different associated functions. Different air pressures and set up presets can be enabled so that there can be different pressures for the same function, all of which can be controlled on the move from the tractor cab.

It should be noted that it has been found that inflatable pneumatic operators in the form of airbags have been found to be a preferred type of pneumatic operator.

The term "airbag", as used herein, is defined to mean any type of inflatable pneumatic operator, without limitation, including convoluted and non-convoluted devices with single and multiple air access ports, and ports at different locations. Single and double acting units are also included, such as in-line double acting units and single function airbags, such as lift and down-force airbags.

BRIEF DESCRIPTION OF THE DRAWINGS

The foregoing features and advantages of the invention will become apparent to those skilled in the art from the following detailed description of one or more preferred embodiments, especially when considered in conjunction with the accompanying drawings in which like numerals depict like parts:

FIG. 1C is a left end elevational view of the system of FIGS. 1A and 1B;

FIG. 4 is a schematic representation of a multi-row pneumatic system for operating a plurality of spaced row-treating units in accordance with the invention that may be attached to a tow-bar or multi-row seed planting implement.

DETAILED DESCRIPTION

Figure 1A:
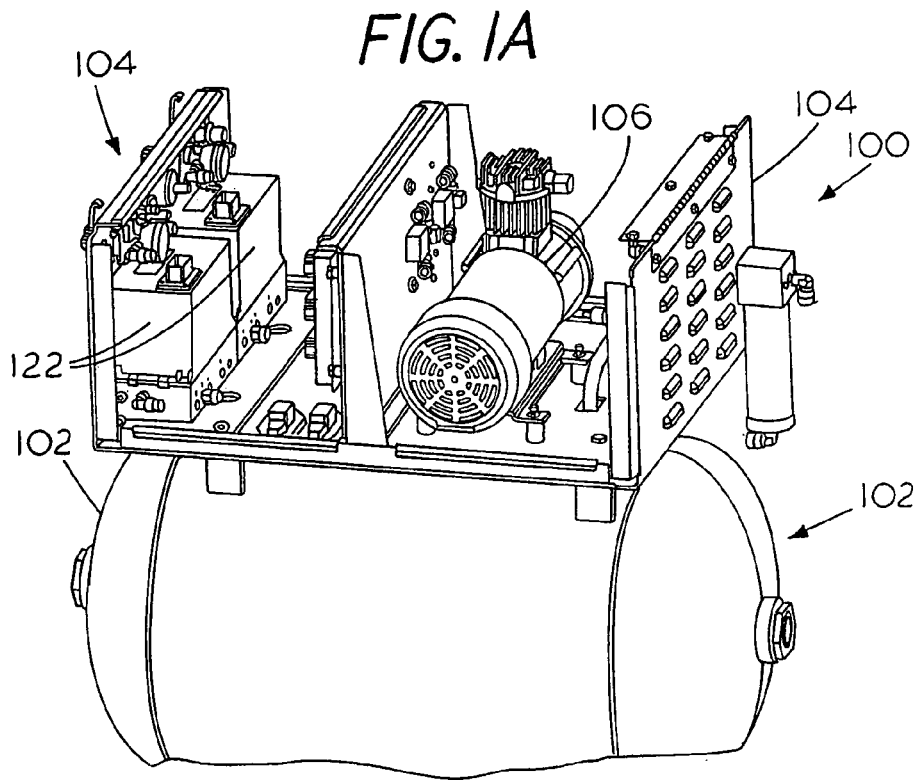
FIGS. 1A and 1B are right and left favored perspective views of a pneumatic system control box with parts of the enclosure removed to expose certain integral parts and a partial accumulator tank view in accordance with one embodiment of the invention.

The detailed description of the illustrative embodiments is intended to illustrate representative examples of the inventive concepts and is not intended to exhaust or limit the scope of those concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom", "left" and "right" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise. As used herein, the term "trench closing mechanism" is meant to include any configuration of wheeled seed, fertilizer, tillage, etc., trench closing device and may be used interchangeably with trench closing wheels. The terms "firming wheel", "firming/packing wheel" and "packing wheel" may also be used interchangeably for such wheel devices used in conjunction with closing systems.

Figure 1B:
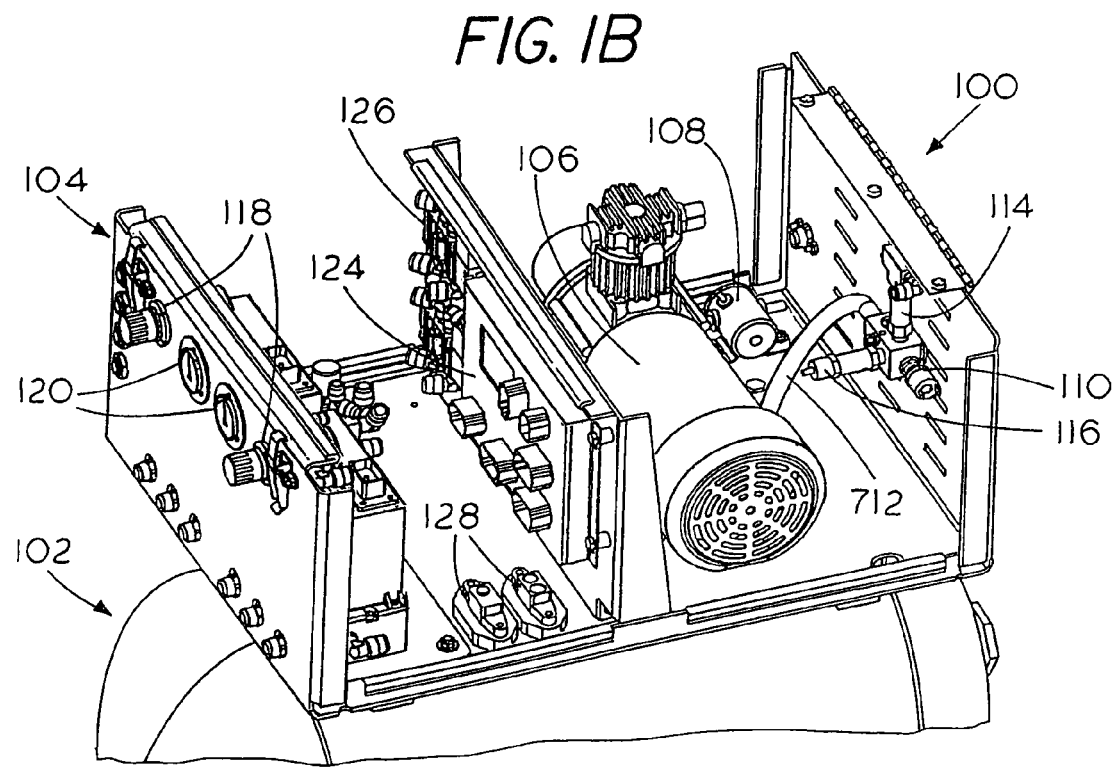

In FIGS. 1A-1C, there is shown a pneumatic system with parts of the control box enclosure removed to expose certain internal parts. The system, shown generally at 100, includes an accumulator tank, shown partially at 102, which may be sized according to the desired capacity of the system for performing the necessary functions. The accumulator tank is provided with mounting 103 and is designed to be mounted on a multi-row seeding implement, or the like, in a well-known manner. A control box housing the control devices for the system is shown at 104. The control box houses an air compressor 106, shown as electric. The compressor is energized and started by an ignition solenoid 108 in conjunction with a pressure switch 110, which senses the pressure in the tank 102 and initiates a sequence to energize the solenoid and start the compressor when the tank pressure drops below a set range. Conversely, when the pressure rises to the maximum pressure of the range, the switch opens and the circuit is de-energized and this switches the solenoid shutting down the compressor. The cycle is repeated as needed during the operation of the pneumatic system.

The compressor output line is shown at 112 and a check valve is shown at 114 that prevents back flow from the tank 102. A safety pressure relief or pop-off valve is shown at 116 that prevents over pressurization of the system. Control knobs for manually adjusted pressure regulators are shown at 118 and associated output pressure gauges are shown at 120. These are used to regulate output or operating pressure to elements of the system and their settings may be changed, if necessary, during operation of the implements, but they are preferably preset as changing the settings manually requires the operator to stop and adjust the pressure. Thus, they are best suited to regulate pressures that do not need to be adjusted such as implement lift pressure necessary to overcome gravity.

Figure 2:
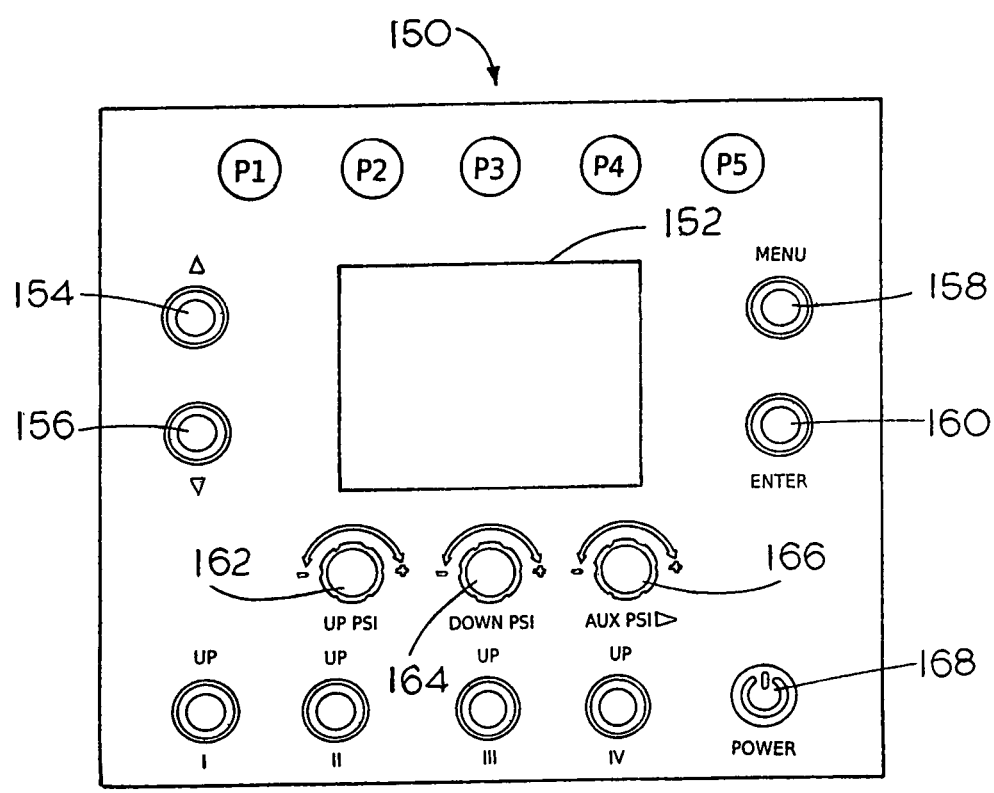
FIG. 2 is a view of a possible cab control panel associated with controlling the operation of the system of FIGS. 1A-1C as applied to one or more row units.

Blocks of electronic air regulators known as PQE's (proportional quick exhaust devices) as at 122 can be used to regulate up and down pressure applied to pneumatic operators for various devices controlled by the system which may include trash whips (row clearing devices), coulters, rolling baskets, or the like, employed prior to seeding and post-seeding implements. The PQE's are controlled by a VDM (valve drive module) 124 that receives commands from a control or switch panel, as shown in FIG. 2 and uses them to control the PQE regulators. A 5-way valve is shown at 126 and more fully described in conjunction with FIGS. 3A and 3B.

FIG. 2 depicts one possible control or switch panel 150 designed to interface between an operator and the pneumatic system. The control panel is connected electrically to the VDM which may be a programmable valve driven module which is designed to drive a plurality of proportional current coil valves with a variety of command input signals that can be adjusted, in turn, sends commands to all of the valves and regulators. Thus, buttons P1-P5 represent an array of preset pressures for various regulators. These can be used to fix preferred conditions. The panel also includes a display screen 152, up and down screen scroll buttons 154 and 156. A menu button 158 allows the operator to view all menu screens, fault codes, adjustment of dump valve times, maintenance information, etc. An enter button 160 is associated with the menu screens and is also used to turn on the pneumatic system.

Controls 162, 164 and 166 are encoders that enable the operator to change the commanded pressure of each of the regulators.

The four buttons on the bottom of the switch panel with the word "UP" above them and numerals one through four below them are the buttons that actuate dump valves and the 5-port valves 126 (FIG. 1B). These buttons can be attached to the valves in any order. Typically, the first one would be attached to a dump valve circuit of dump valves on a seeding device. These buttons are used to switch the different attachments from the down position (with the button turned off) to the "UP" position (with the button turned on). Not shown is an LED light next to each button that lights when the associated switch is activated. A power button is shown at 162.

Figure 3A:
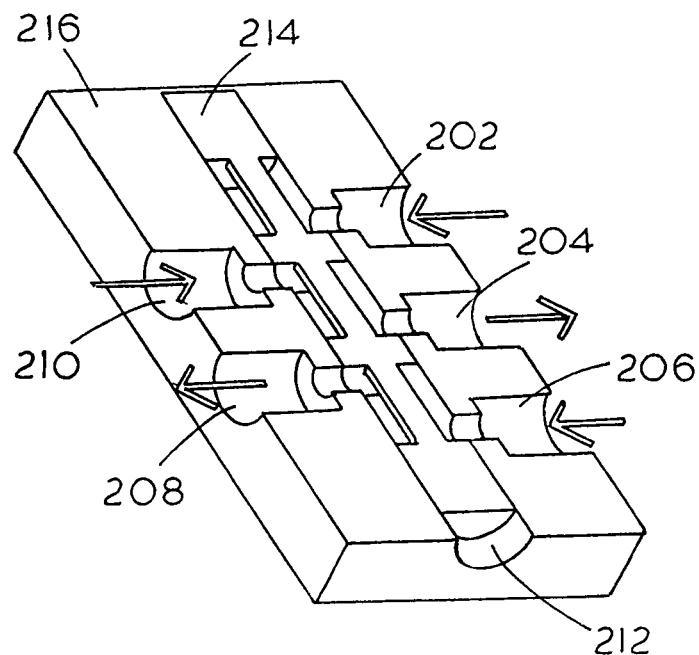
FIGS. 3A and 3B depict a typical 2-position plunger-operated, 5-port valve such as can be associated with the operation of pneumatic operators in accordance with the invention shown in alternate positions.
Figure 3B:
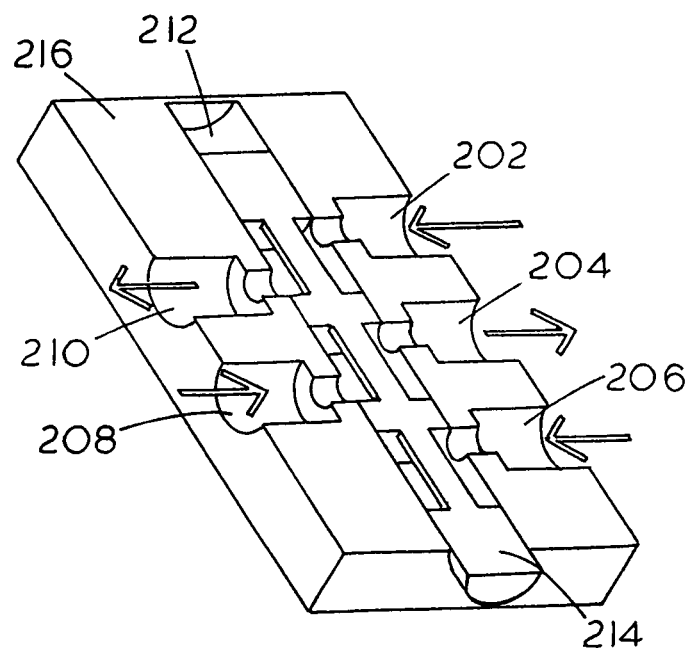

FIGS. 3A and 3B are schematic representations of a two-position, five-port air valve assembly (as at 126 in FIG. 1B) in two alternative positions. The assembly, generally at 126, includes ports 202, 204, 206, 208 and 210 and cylinder 212, housing axially adjustable cylinder valve or plunger 214. The valve body or block is depicted at 216. Ports 202 and 206 are connected to receive air from a high pressure air source. Thus, port 206 is connected to receive compressed air via a manual regulator to provide lift force. Port 202 is connected to receive air via a PQE. Ports 208 and 210 connect respectively to a lift force airbag or other pneumatic operator and a down force airbag or operator. Finally, port 204 is a vent port for venting air from either the up force operator or the down force operator.

In FIG. 3B, the port receiving high pressure air 202 is connected through the valve block with a down force operator through outlet port 210 with the central valve plunger 214 shifted down (in the drawing) in cylinder 212 in a first position. With the central cylinder in this position, the corresponding lift force operator is connected to the vent port 204 via port 208 so that lift force operator is enabled to collapse while the down force operator inflates. This deploys the corresponding implement.

FIG. 3A shows the valve 126 in an alternate position with the central cylinder moved upward (in the drawing). With the plunger in this position, port 206 is connected through the central cylinder to port 208 and port 210 is connected through the central cylinder to vent port 204 and port 202 is dead-headed. With the valve in this position, the source of high pressure air is connected through ports 206 and 208 to the lift force operator and the down force operator is connected to vent through ports 210 and 204. This will enable the lift force operator to inflate and the down force operator to collapse in accordance with raising the corresponding implement to a lowered or deployed position.

The pressure in corresponding airbags or other pneumatic operators may also be advantageously controlled by using hand adjustable regulators or PQE's to inflate an airbag to any desired pressure. In this manner, opposed airbags or operators may be inflated at the same time producing forces in opposition on a common lever. The inflation of one bag to a lesser degree produces a lesser force that creates a shock-absorbing effect on the mechanism and smoothens out the operation of the device. This is particularly useful in producing a "net" force or a coulter, for example, where control of the depth of soil penetration is important. This can be done using any relative amount.

In addition, a plurality of generally applicable preset pressures may be programmed into the system. For example, 5 presets may be programmed for all the different pressure ports controlled by the VDM and PQE devices. This allows the operator of a planter, or other multi-row implement, and all the associated tools being controlled, including row unit implements, to have a choice of the several fixed down pressures and/or lift pressures preset for 5 different soil conditions in the same field. Those can be controlled by preset buttons, as shown at P1-P5 in FIG. 2. By simply touching a preset button for a pressure best suited to the existing conditions, the planter, or the like, and its associated devices can be automatically set for the appropriate soil condition. The system responds by entering values in the control or through the use of an existing virtual terminal in the tractor cab that is connected to the VDM through an ISOBUS cable. Additionally, when an adjustment is made during an operation, it can be saved to memory be depressing and holding a chosen preset button. The operator does not have to save it in the present the control was operating in before the change.

In this manner, the system is designed to allow for control and adjustment of the devices while on-the-fly during planting, etc. This enables an improved mode of operation to be realized, including all the tools on the planter and many hours of mechanical adjustment by hand can be eliminated.

FIG. 4 is a schematic representation of a multi-row pneumatic system layout that can be controlled by the system of FIGS. 1A-1C. The schematic includes a plurality of central section row units as at 260 and these are flanked by a plurality of wing section units as at 262 and 264. A center section unit down pressure air line is shown at 266 that supplies down pressure to the center units through a manifold 268. A further pressurized air line 270 supplies pressurized down-force air to wing section units 262 and 264 through manifolds 272 and 274, respectively. A common lift pressure system is shown using air line 276 which supplies manifolds 278, 280 and 282. Each of the pressurized lines supplying each of the sections of row units includes a solenoid-operated dump valve, sets of which at 284, 286 and 288 are associated with the center section units 260 and wing section units 262 and 264, respectively.

Figure 5A:
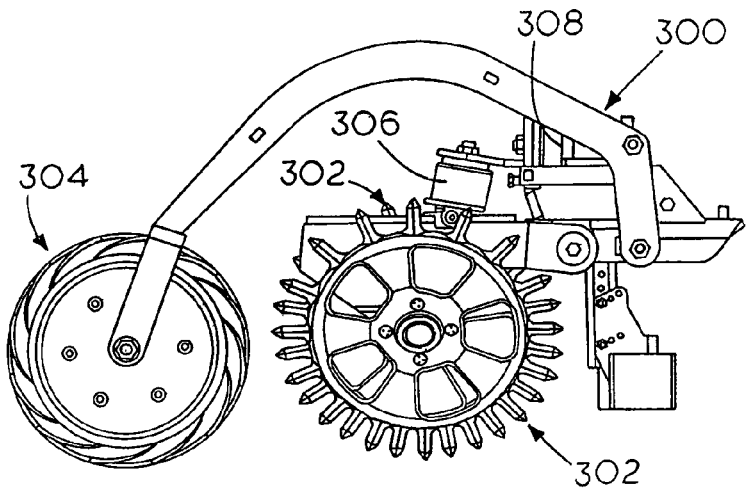
FIGS. 5A-5E depict a variety of examples of pneumatically-operated row treating unit implements that can be operated using the pneumatic system of the invention.
Figure 5B:
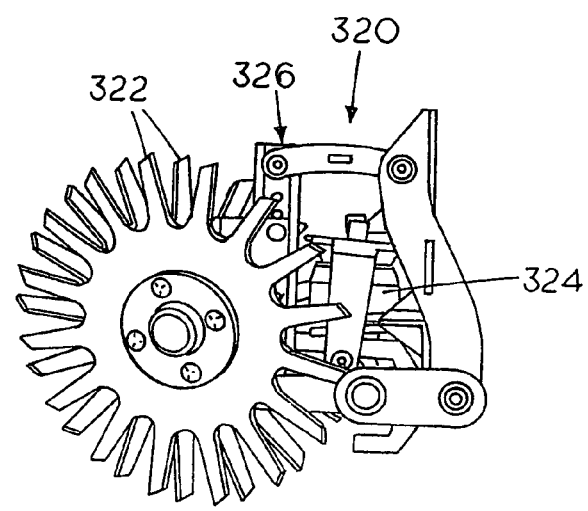

FIGS. 5A-5E depict a variety of examples of pneumatically-operated implements as examples of those such as can be used in row treating units using the pneumatic system of the invention. FIG. 5A shows a unit 300 that includes seed trench closing wheels 302 and packing wheel 304. The closing wheels are deployed with down-force airbag 306 and the packing wheel includes a pneumatic lift system at 308. FIG. 5B depicts a row clearing or trash whip implement, generally at 320, with a pair of pneumatic operators, one of which that raises trash whip wheels 322 is shown at 324. A down-force bag (not shown) is also to provide a down force on the frame 326.

Figure 5C:
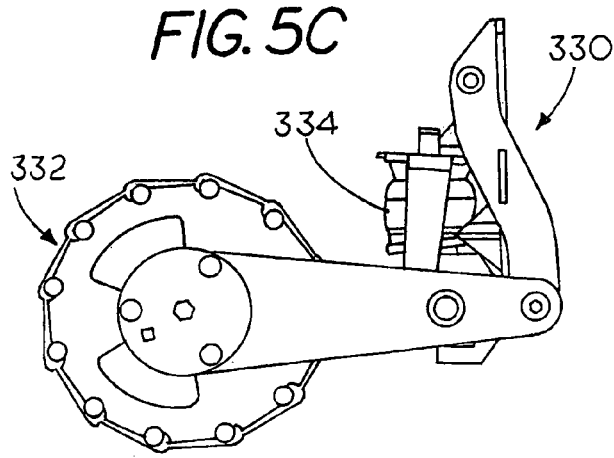
Figure 5D:
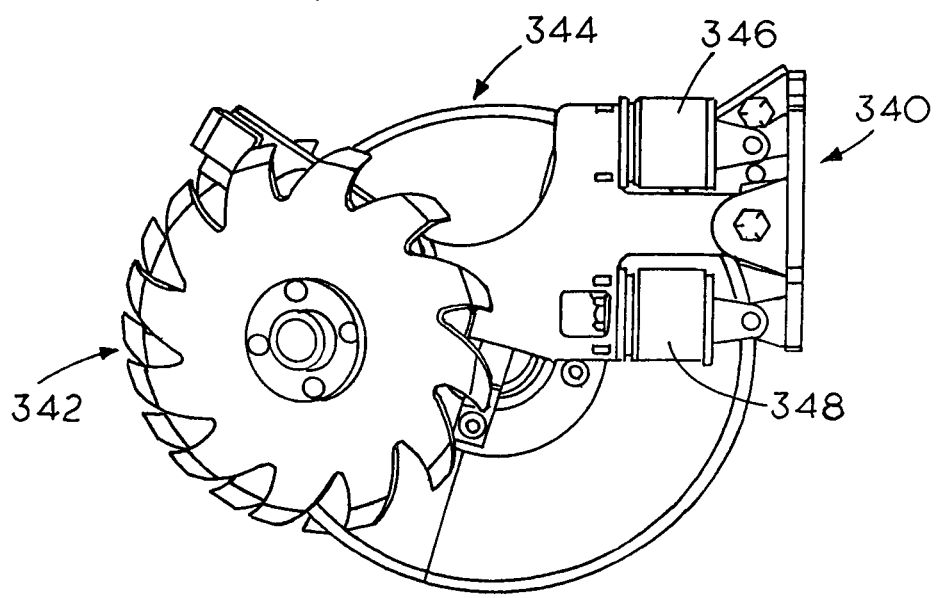

FIG. 5C shows a rolling basket system at 330, including a basket 332 and lift airbag 334. In FIG. 5D, there is shown another combination implement at 340 that includes a row clearing or trash whipping device 342 in combination with a coulter wheel 344. Pneumatic operators are shown at 346 and 348 to apply down and lift forces, respectively.

Figure 5E:
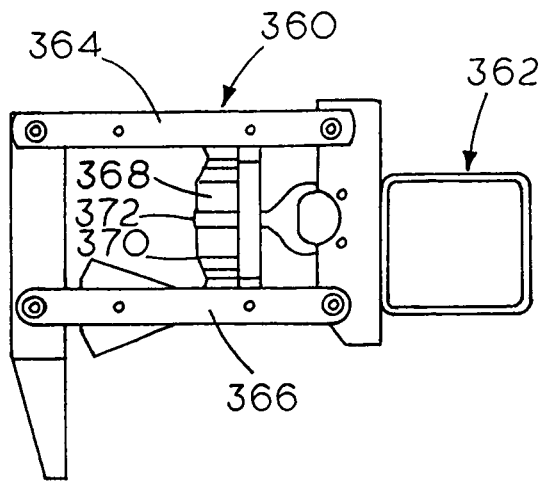

FIG. 5E illustrates a pivotally-mounted implement carrying frame 360 attached to a tool bar 362, or the like, that is designed to carry an implement. The frame includes spaced parallel upper and lower members 364 and 366. The frame is pivoted up and down by a dual in-line airbag arrangement that includes lift airbag 368 and down-force airbag 370 which operate between the corresponding members 364 and 366 and a fixed member 372 to pivot the frame, as desired.

It will be appreciated that many different implements and combinations of implements may be operated by the present system using a variety of types of airbags or other pneumatic operators the embodiments and examples shown and described illustrate the principles, but are not meant to limit the scope of the invention concept as variations and modifications may occur to those skilled in the art.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A pneumatic control system for operating a plurality of pneumatically-controlled row treating units for multi-row agriculture implements comprising:
   (a) a source of pressurized air comprising a compressor and an accumulator;
   (b) a plurality of adjustable electronic proportional quick exhaust (PQE) air pressure regulators controlled by a valve drive module for controlling the pressure of air distributed to a plurality of connected pneumatic operators associated with controlling the deployment of implements;
   (c) a plurality of switching valves for controlling the operation of said connected pneumatic operators;
   (d) a remote switch panel or control panel for controlling the operation of said pneumatic operators; and
   (e) wherein said multi-row agriculture implement is addressed using a manifold system or a plurality of parallel manifold systems, each connected to a plurality of row treating units and a plurality of dump valves for depressurizing pneumatic operators associated with each of said manifold systems.

2. A pneumatic control system as in claim 1 wherein said adjustable air pressure regulators include one or more manually set and adjustable pressure regulators.

3. A pneumatic control system as in claim 1 wherein said plurality of switching valves include 5-port solenoid valves.

4. A pneumatic control system as in claim 1 further comprising a plurality of valve drive modules (VDM) for controlling air pressure regulators and switching valves.

5. A pneumatic control system as in claim 1 wherein said remote switch or control panel is located in the cab of a tractor.

6. A pneumatic control system as in claim 1 wherein said pneumatic operators include airbags.

7. A pneumatic control system as in claim 1 wherein said operators include both down force and lift airbags associate with one or more of said implements.

8. A pneumatic control system as in claim 4 wherein commands can be given from a virtual terminal through the tractor and an implement CANbus network.

9. A pneumatic control system as in claim 2 wherein one or more air pressure regulators are controlled at a plurality of remotely switchable settings.

10. A pneumatic control system as in claim 4 wherein commands can be given from a virtual terminal using a CANbus network.

* * * * *